United States Patent [19]

Messerges et al.

[11] Patent Number: 5,347,548
[45] Date of Patent: Sep. 13, 1994

[54] CIRCUIT FOR SIMULTANEOUS RECOVERY OF BIT CLOCK AND FRAME SYNCHRONIZATION

[75] Inventors: Thomas S. Messerges, Schaumburg; Larry C. Puhl, Sleepy Hollow; Ezzat A. Dabbish, Cary, all of Ill.

[73] Assignee: Motorola Inc., Schaumburg, Ill.

[21] Appl. No.: 901,047

[22] Filed: Jun. 19, 1992

[51] Int. Cl.[5] .......................... H04L 7/00; H04L 7/06
[52] U.S. Cl. ...................................... 375/116; 375/114
[58] Field of Search ............... 375/114, 116, 112, 113, 375/115; 370/105.1–105.5

[56] References Cited

U.S. PATENT DOCUMENTS

| | | | |
|---|---|---|---|
| 4,675,886 | 6/1987 | Surie | 375/116 |
| 4,787,095 | 11/1988 | Forth et al. | 375/114 |
| 4,829,543 | 5/1989 | Borth et al. | 375/83 |
| 5,163,071 | 11/1992 | Gelim | 375/114 |
| 5,204,883 | 4/1993 | Blanc | 375/116 |
| 5,220,448 | 6/1993 | Vogel et al. | 359/158 |

Primary Examiner—Stephen Chin
Assistant Examiner—Kevin Kim
Attorney, Agent, or Firm—Steven G. Parmelee

[57] ABSTRACT

Simultaneously detecting both frame and bit synchronization in a serial bit stream reduces the time required to have a receiver lock up to a transmitted serial data signal. A dual-phase correlator circuit is used to detect frame synchronization while a multiphase commutator circuit detects bit clock synchronization.

9 Claims, 6 Drawing Sheets

CIRCUIT FOR SIMULTANEOUS RECOVERY OF BIT CLOCK AND FRAME SYNCHRONIZATION

FIELD OF THE INVENTION

This invention relates to data communications networks. More particularly, this invention relates to circuits and methods by which timing information in a serial digital signal can be derived.

BACKGROUND OF THE INVENTION

Data communications between computers is accomplished in a variety of ways. So-called local area networks, as well as wide-area networks, are networks of computers that permit the exchange of data between computers by using either hard wired connections or two-way radio communications devices that permit data to be exchanged between machines.

It is anticipated that some local-area networks will soon become wireless by using some form of transmitted electromagnetic waves to exchange data between computers. So-called wireless local-area networks will avoid the costs associated with establishing, maintaining, and re-configuring hard-wired local area networks. It is anticipated that wireless local area networks will use radio signals instead of light or infrared signals because in part of the problems associated with reliable propagation of visible light waves or infrared waves in an office environment.

In the United States, the Federal Communications Commission (FCC), as of 1985, authorized the unlicensed use of the frequency bands between 902–928 MHz, 2.4–2.483 GHz., and 2.725–5.85 GHz. To qualify for unlicensed use, the FCC has imposed certain requirements that limit transmitter power and the time a user can broadcast on any one frequency in these bands, in order to prevent one user from monopolizing one or more channels. A wireless local area network that uses one or more of these bands would have to limit the output power of its radio transmitters and might have to be able to hop between frequencies.

To reliably transmit data on a wireless local area network, whereon the subscriber units are continuously hopping from one radio channel to another, requires the transmitters and receivers of such a network to maintain their synchronization to each other. As a transmitter hops from one channel to another, receivers of the transmitter's signal must be able to detect, demodulate, and synchronize with the signal from the transmitter.

Most embodiments of wireless, radio frequency (RF) LAN's that use a channel hopping methodology require the transmitter to send a synchronizing sequence, or preamble, of digital signals ahead of any data to permit a receiver to locate and synchronize itself to the transmitter. Since all digital sequence detectors used in a receiver require a finite amount of time to detect a particular digital sequence in a preamble as an indication of synchronization, reducing the amount of time that it takes for a sequence detector to achieve complete synchronization might offer significant benefits to an RF LAN that has its transmitters and receivers continuously hopping between channels. Reducing the time that it takes a receiver to lock up with a transmitter might allow more data and less preamble to be sent in a given time interval.

Those skilled in the art will recognize that virtually all useful digital data in a computer or other digital device is comprised of parallel digital data words or bytes. Sending these parallel digital quantities is most often accomplished by sending the data serially. Present day data communications using conventional modems exchange data between computers over telephone lines by sending data serially. Serial data is typically organized into binary digits, or bits, of course, but in addition, contiguous bits in the digital information typically comprises words, or bytes. In a serial bit stream, in a serial data communication network, including LAN's, there is a grouping of bits, often referred to as a frame, that is made up of several bits and perhaps several words or bytes. In most serial data networks, accurate reconstruction of the original digital information requires both a bit synchronization (which is the detection of individual bits in the serial information stream) and a frame synchronization (which is the detection of the start and stop points of a frame of digital information).

In an RF LAN, or any other serial data communications system, reducing the time it takes to achieve both bit and frame synchronization would improve the efficiency of the system. As the length of the preamble sent ahead of the data of interest is decreased, more of the data of interest can be sent in its place. Accordingly, any method or apparatus that reduces bit and frame synchronization time would be an improvement over the prior art.

BRIEF DESCRIPTION OF THE DRAWINGS

FIG. 2-1 shows a graphical representation of the segmentation of a computer file and its transmission in different time intervals on different frequencies.

FIG. 2-2 shows an example of a preamble and data frame.

FIG. 5-1 shows a simplified block diagram of a bit and frame recovery circuit.

FIG. 5-2 shows a block diagram of a bit and frame recovery circuit.

FIG. 6-1 shows a block diagram of a two-phase correlator circuit.

FIG. 6-2 shows a multi-frame preamble.

DESCRIPTION OF A PREFERRED EMBODIMENT

Figure 1:
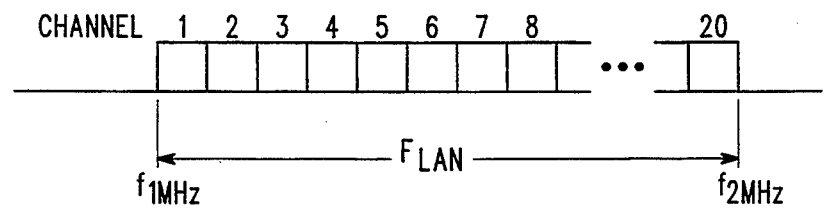
FIG. 1 shows a hypothetical division of a portion of the radio frequency spectrum.
Figure 10:
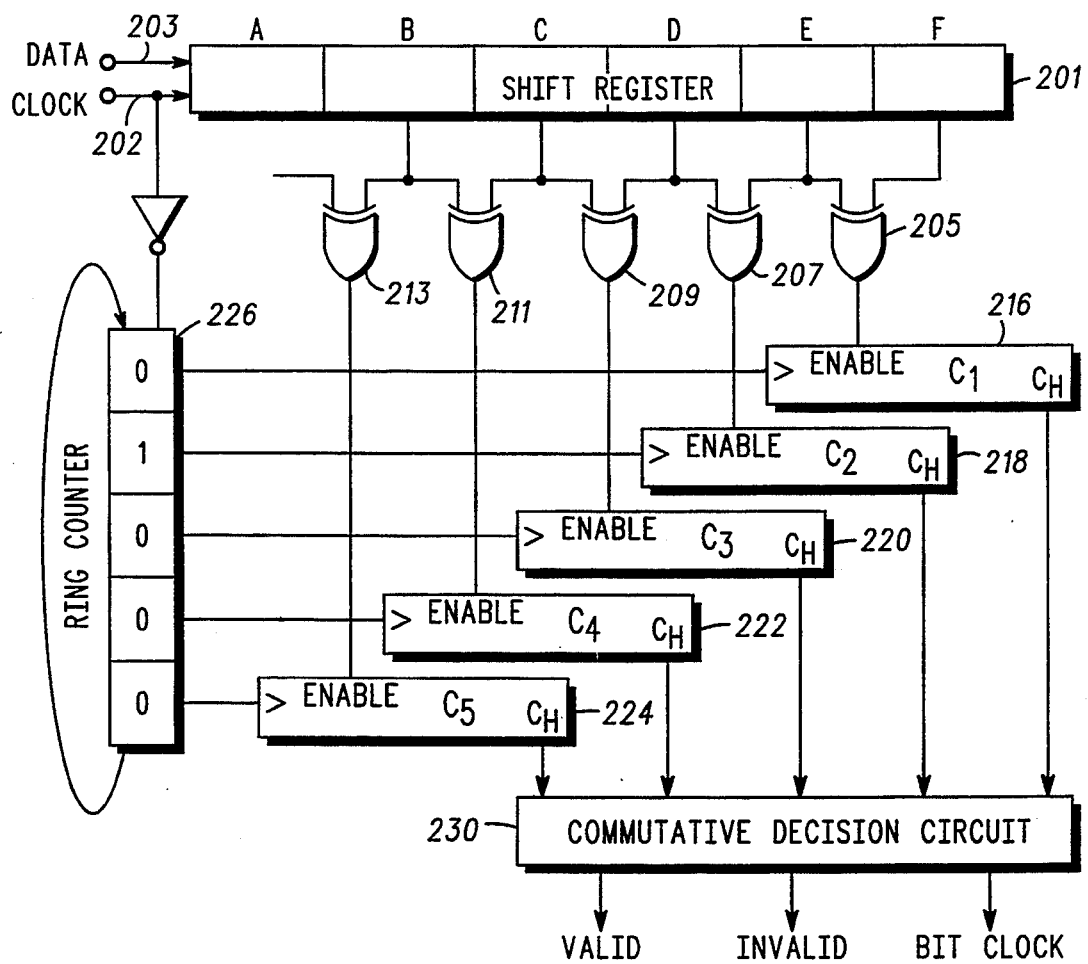

FIG. 1 depicts how a portion of the radio frequency spectrum ($F_{lan}$) might be subdivided into a plurality (twenty, in FIG. 1) of communication channels. Each channel might actually be a pair of radio frequencies so as to permit duplex communications. Alternatively, each channel might be a single frequency.

Figure 2:
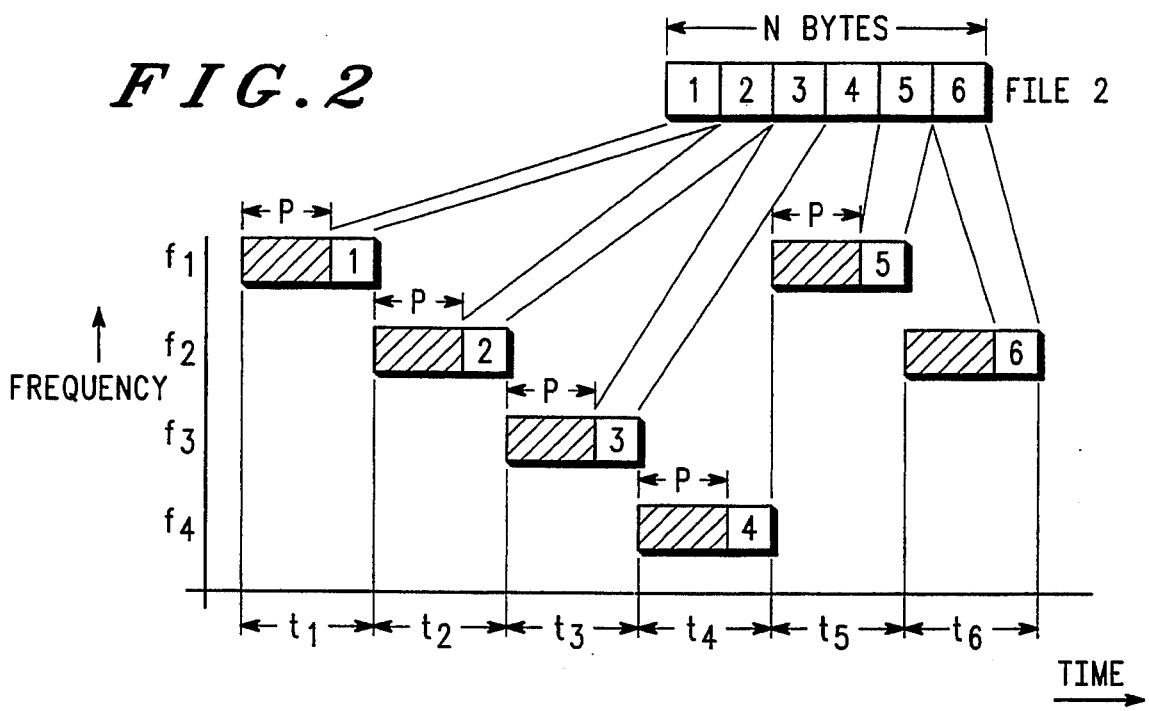

In FIG. 2-1, a computer file (F) comprised of some number of bytes, n, is depicted as being subdivided or segmented into six portions. Each of these portions or segments is shown as being transmitted on one of four frequencies ($f_1$-$f_4$) in six substantially continuous time periods ($t_1$-$t_6$). Each of the segments (1-6) of the file (F), is transmitted after a preamble (P) used by a receiver portion of a transceiver of a radio based wireless local area network. The preamble (P), an example of which is shown in FIG. 2-2, is sent ahead of the data to permit the receiver portion of the transceiver to synchronize itself to the transmitter.

Figure 3:
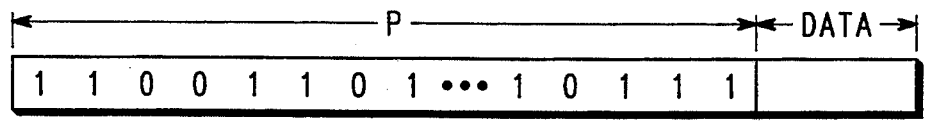
FIG. 3 shows a block diagram representation of a wireless local area network for computers.

In FIG. 3, three subscriber units 12, 13, and 15 comprise a wireless local area network (10). Each subscriber unit (12, 13, and 15) is comprised of a computer (14), an RF modem (16) comprised of a modem (17) and a radio transceiver (18) (a combined transmitter and receiver), as well as a transmission line and antenna combination (20).

The computer (14) could be any digital device such as a personal computer for example, the particular character, identity, or selection of which is not critical to the invention disclosed herein. The transceiver (18) is comprised of a radio frequency transmitter that broadcasts at the frequency band of interest, radio frequency signals that represent the digital data output from the personal computer.

Figure 4:
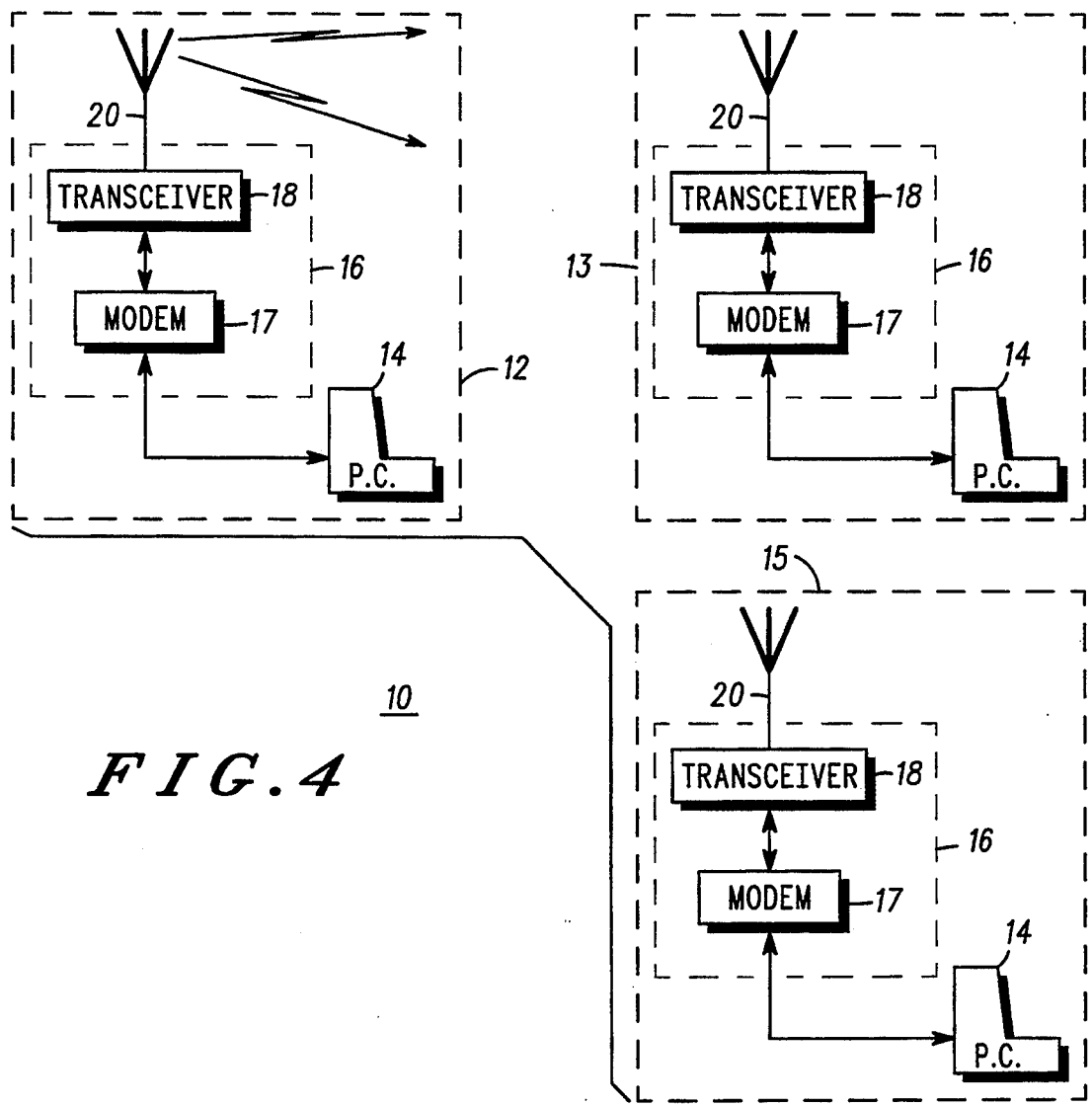
FIG. 4 shows a block diagram of a computer with an RF modem that contains a synchronization circuit that recovers bit sync and frame sync timing from a serial bit stream simultaneously.

FIG. 4 shows, in somewhat greater detail, the functional elements of a subscriber unit (12) for an RF LAN. The transceiver (18) is comprised of a radio transmitter (18-1) that is modulated by data from the computer (14). Signals received from the receiver/transmitter line (20) are demodulated by a receiver (18-2), the data output of which is coupled into a sync signal recovery circuit (50).

Figure 5:
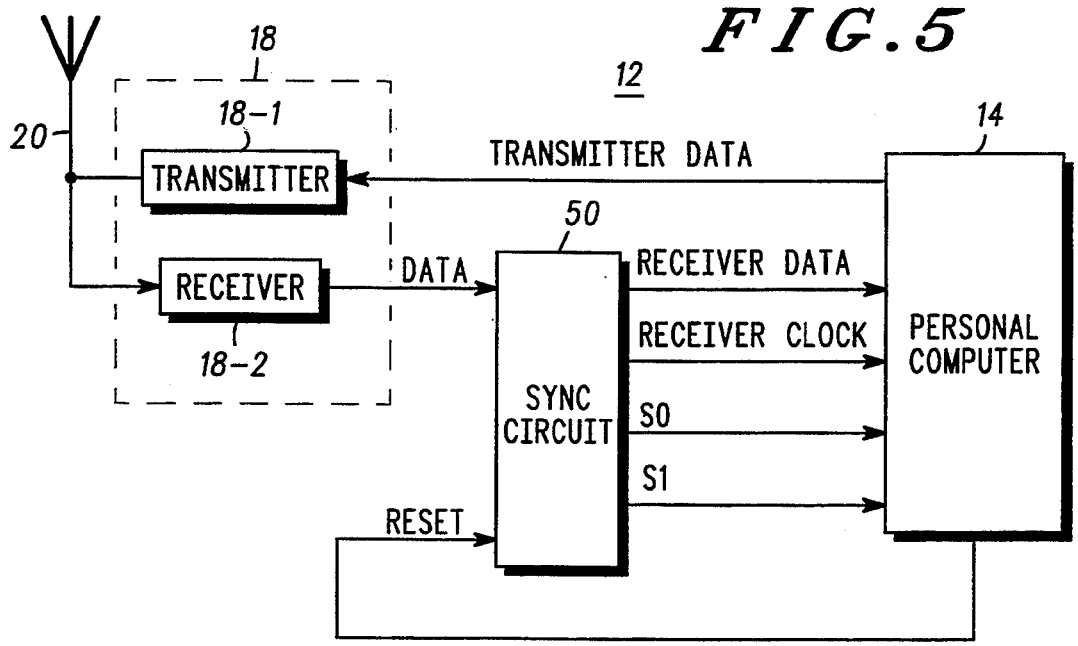

FIG. 5-1 depicts a simplified block diagram of the sync recovery circuit (50) that simultaneously acquires bit synchronization and frame synchronization from a serial data signal. Acquiring both frame and bit synchronization simultaneously substantially reduces the time required by prior art sequence detector circuits.

FIG. 5-2 shows the functional elements of the sync recovery circuit (50) shown in FIG. 5-1. Two outputs are provided (52 and 54) to indicate whether or not synchronization has been detected. One of these outputs will go active when the bit clock is valid, indicating that the circuit (50) has successfully detected the frequency of the incoming bit clock rate. The other output will go active when frame synchronization has been achieved. (Frame sync occurs when the two-phase correlator, 100 has detected the starting point of a frame.)

In FIGS. 5-1 and 5-2, the dual phase correlator circuit (100) provides a means for indicating frame synchronization of the receiver (18-2 in FIG. 4) to the transmitted signal. In FIGS. 5-1 and 5-2, the commutator (200) provides a means for establishing the validity of the clock or data rate of the data stream broadcast from an RF LAN transmitter and for providing a so-called bit clock signal derived from the data stream.

Figure 6:
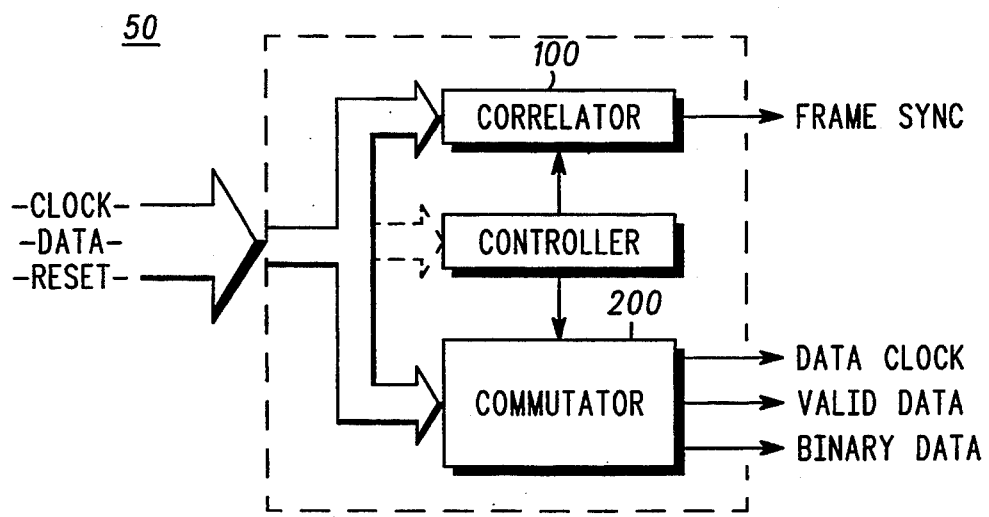

The dual-phase correlator circuit (100) is shown more clearly in FIG. 6-1. In FIG. 6-1, incoming data, which is typically a data stream detected and demodulated by the receiver portion (18-2 in FIG. 4) of the transceiver (18 depicted in FIG. 4), is an input to two shift registers (108 and 116). The length of these shift registers is designated in FIG. 6-1 as being M bits in length where M corresponds to the number of bits expected in a particular frame sync word in the preamble (P) of the wireless local area network.

FIG. 6-2 depicts a hypothetical sync sequence for a preamble P depicted in FIG. 2—2. In FIG. 6-2, four identical sync patterns are transmitted followed by transmission of a sync-complement pattern. The detection of these sync patterns followed by detection of a sync complement pattern ensures that the two phase correlator circuit (100) depicted in FIG. 6-1 has successfully sync locked the receiver (18) to the received signal from the transmitter.

In the preferred embodiment, the preamble (P) had 20, identical, twenty-bit sync words, followed by one sync-complement word. The use of twenty sync words and one sync-complement word is a design choice and alternate embodiments might require greater or fewer sync words to insure reliable synchronization. Twenty-bit shift registers were used in the correlator. Data (102) is synchronously clocked into two, 20- bit shift registers (108 and 116) by two different clock signals offset from each other by one-hundred eighty degrees (104 and 106).

Clock signal 106 differs from clock signal 104 in that the second clock signal ($f_1 + 180°$) is 180° phase shifted from clock signal $f_1$ thereby giving rise to the descriptor of the correlator as a two-phase correlator. The frequency of the clock signals $f_1$, and ($f_1 + 180°$), is predetermined and is intended to be closely matched to the expected input frequency of the data (102) received by the subscriber unit of the wireless local area network. A two-phase clock signal ensures that at least one of these two clock signals will coherently and reliably latch incoming data bits (102) into one of the shift registers (108 or 116).

The output of each shift register (108 and 116) is compared in a corresponding M-bit digital comparator (110 and 118) with a predetermined bit pattern, called the sync word. Each digital comparator tests the contents of the corresponding M-bit shift registers (108 and 116) for a match to the sync word. The occurrence of a match between the contents of the shift register and the sync word indicates that the sync word has been successfully clocked into one of the shift registers (108 or 116). The sync word of the preamble (P in FIG. 2-2) is a design choice and is typically chosen to be a pattern of ones and zeroes such that its detection by a comparator ensures that frame synchronization has been successfully detected.

The output of each digital comparator (110 and 118) is comprised of two signals; in the case of the first digital comparator (110), a sync signal (112) and a sync complement (114) signal are both produced. In the case of the second comparator (118) a sync (120) and sync complement signal (122) are also produced. All four of these outputs are coupled to the correlator decoder (101) shown in FIG. 5-2. The sync complement output signal is active or true in the preferred embodiment when the digital comparator (110 or 118) has detected the exact complement of the same pattern in the M bit shift registers.

In the preferred embodiment of the invention a controller, which is preferably a state machine, preferably implemented with the other functional elements of the invention in a field-programmable gate array (FPGA), monitors the outputs of the sync and sync complement outputs from these digital comparators (110 and 118) and can test for the occurrence of a sync pattern detection and the subsequent detection of the sync complement pattern detection to ensure that frame synchronization in the preamble has been successfully detected. The comparators, which compare the contents of these first and second shift registers to sync and sync-complement patterns, in combination with the controller, provide a signal indicating frame synchronization has been achieved. If a frame sync pattern has been detected but is not followed by detection of a sync complement pattern, frame synchronization of at least the frame depicted in FIG. 2-2 can be considered to be absent.

Figure 7:
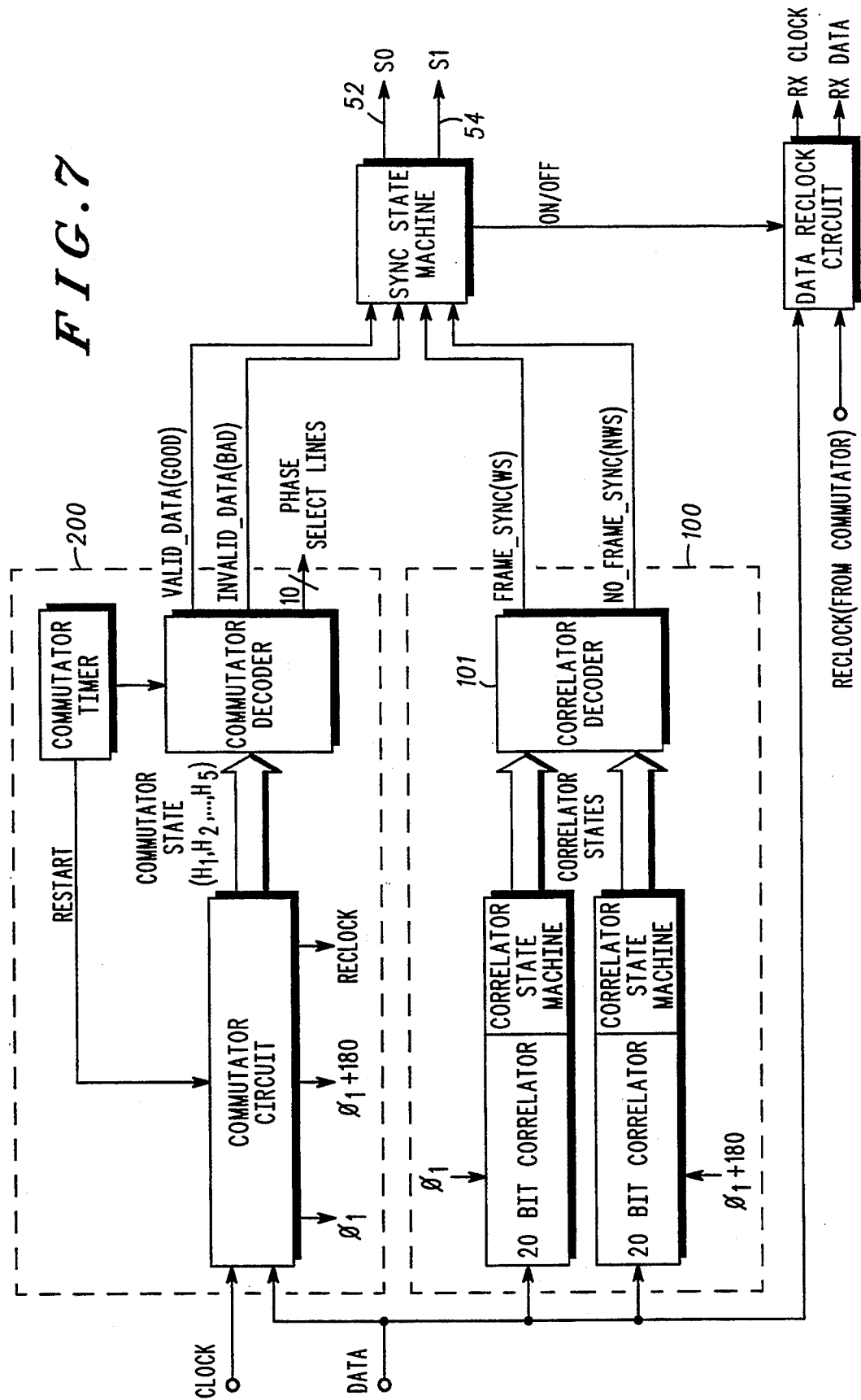
FIG. 7 shows a block diagram of a digital commutator.

FIG. 7 depicts a block diagram of a five-stage digital commutating circuit (200) shown in FIG. 5-1. In FIG. 7, a 6-bit shift register (201) has data (203) synchronously clocked into it by means of a clock signal (202). The output of each bit position (A-F) of the shift register (201) is exclusive ORed with the adjacent bit position by means of a series or plurality of exclusive-OR gates (205, 207, 209, 211, and 213).

A digital ring counter (226) continuously loops a single binary digit in response to the clock signal (202) that is coupled into the ring counter (226). This single binary digit that rotates in the ring counter (226) acts as a rotating clock signal ($\phi_1$–$\phi_5$) to the five counters (216–224 as shown).

The combination of the shift register (201) and exclusive OR gates (205–213) with the counters (216–224), the ring counter (226) and the decision circuit (230) provide a digital commutator circuit that accurately derives a bit clock from the incoming data stream on the wireless local area network asynchronously with respect to the incoming data stream. Operation of the circuit depicted in FIG. 7 may be more easily understood by reference to the simplified circuit depicted in FIG. 8 and its associated timing diagram shown in FIG. 9.

Figure 8:
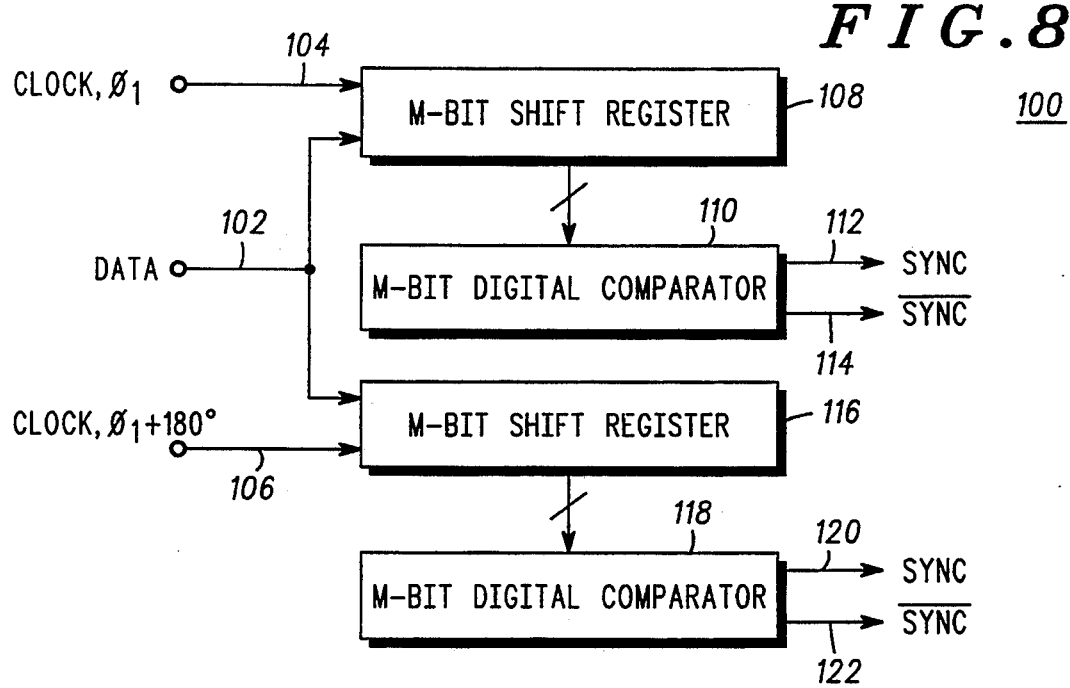
FIG. 8 shows a simplified diagram of a simplified digital commutator shown in FIG. 7.

FIG. 8, a three-stage digital commutating circuit (300) is comprised of a four-bit shift register (302), exclusive OR gates (304–308) a ring counter (314) and three synchronous counters (316–320). A control circuit block (322) monitors the outputs from these counters (316–320) and outputs a valid or invalid decision signal as well as a bit clock signal.

Figure 9:
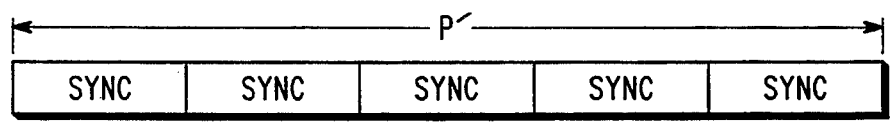
FIG. 9 shows a timing diagram for the circuit shown in FIG. 8.
Figure 11:
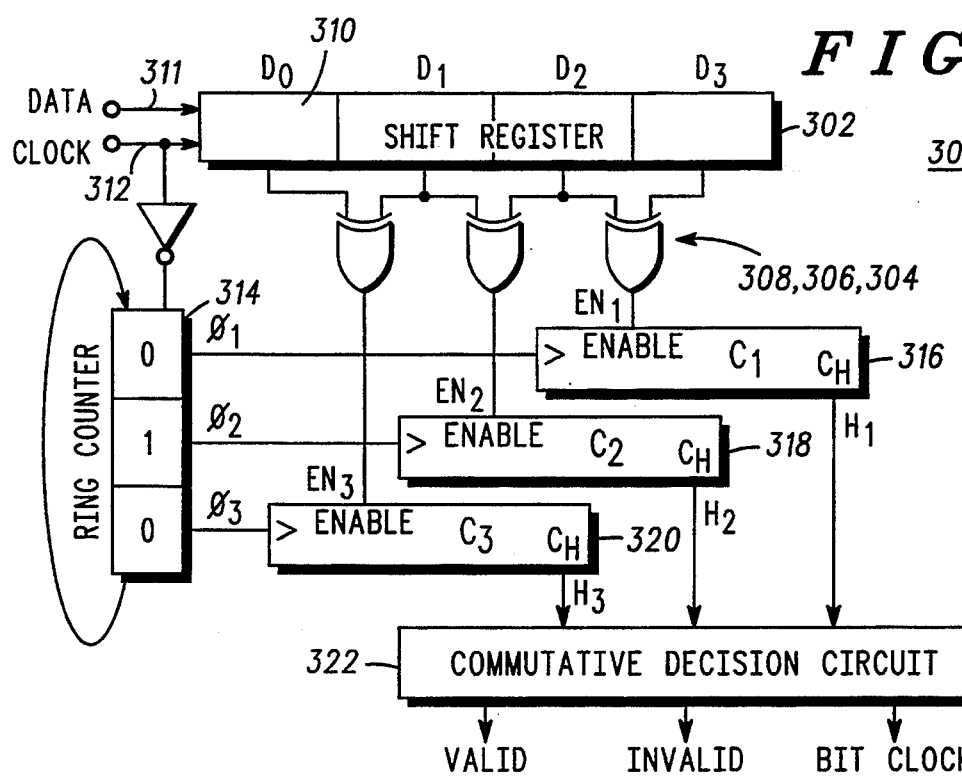
Figure 12:
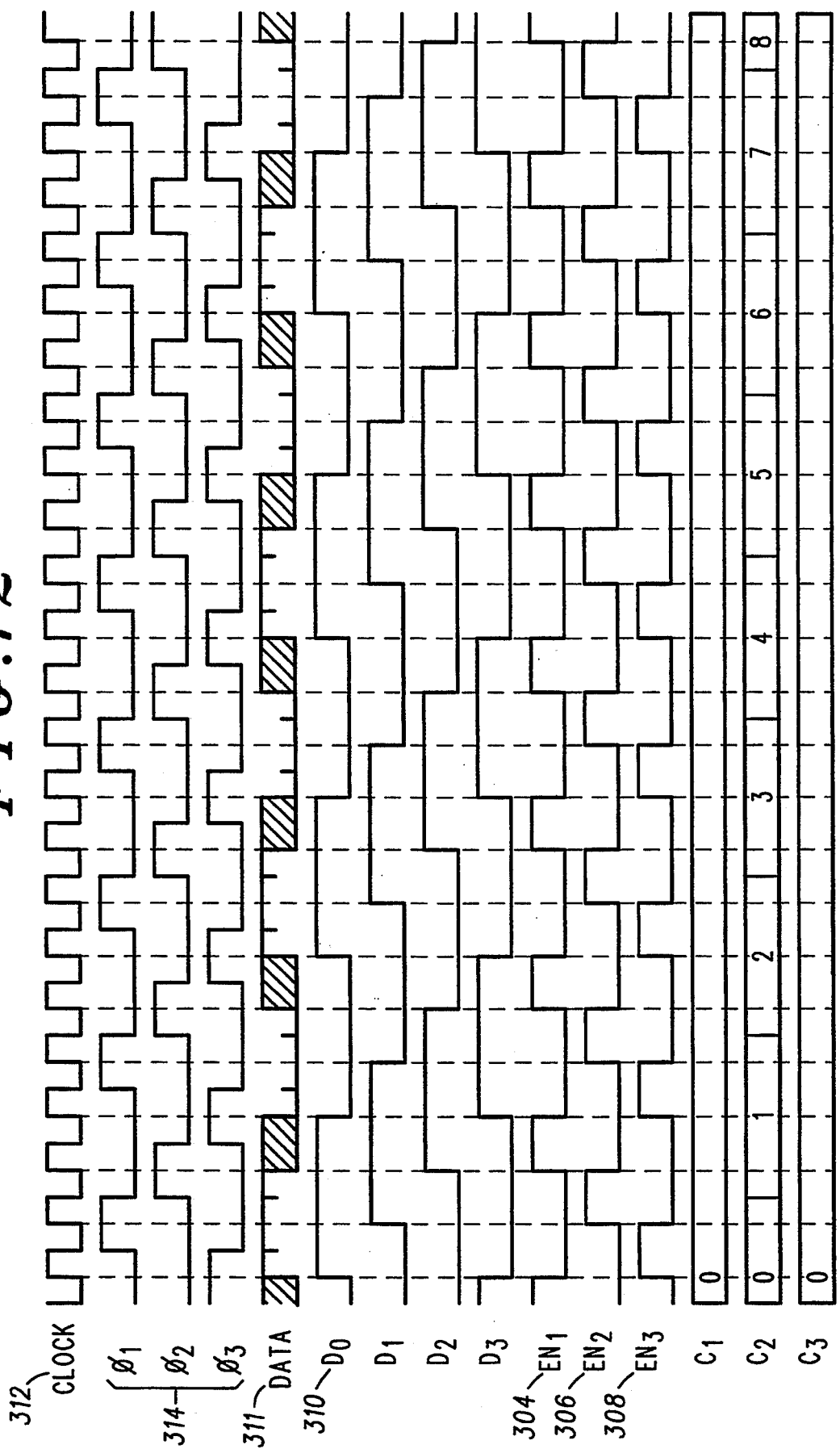

Referring now to FIG. 9, the clock signal shown in FIG. 8 and identified by reference numeral (312) is shown as the top trace and has a clock frequency three times the rate of the incoming data signal (311). The outputs of the ring counter (314) are depicted in FIG. 9 as $f_1$, $f_2$ and $f_3$. Each of these is shown in FIG. 8. (The incoming data stream is identified by reference numeral 311.)

Counter 318 in FIG. 8 is incremented when the rising edge of $\phi_2$ occurs while the output of the exclusive-OR gate 306, (EN2 in FIG. 8) is true. EN1-EN3 are means for monitoring the occurrence of bit transitions in the incoming data stream (311 in FIG. 9). When an enable signal is true during the rising edge of a clock signal the corresponding counter is incremented. Since the bit transitions in a valid data stream will occur at regular intervals, only one counter should be incremented. If incoming data (311) is not at the proper bit rate, data transitions will not occur at the correct regular interval and multiple or no counters will be incremented.

In FIG. 8 and FIG. 9, bit transitions of the data stream (311) occur at times that allow counter 318 to be incremented. The commutative decision circuit (322) will detect that counter 318 is the only counter that was incremented and will thereby be able to determine the locations of the bit transitions of the incoming data stream (311). Once the relative time of the bit transitions is known, the temporal center of the bit can be determined.

In FIG. 8 and FIG. 9, counter 318 is incremented and the temporal center of the incoming data 311 is between the rising edge of $\phi_1$ and the rising edge of $\phi_2$. Therefore, the decision circuit (322) will output a clock signal, substantially centered between $\phi_1$ and $\phi_2$ as the recovered bit clock. The selection of the recovered bit clock is preferably accomplished using a digital multiplexor circuit that chooses the bit clock depending on the state of the commutative counters (316, 318, 320). Operation of the five-stage commutator shown in FIG. 7 is analogous. An N-stage digital commutator circuit will have N counters and produce a recovered bit clock that is within 1/N'th of a bit from the temporal center of the incoming data (311 in FIG. 9).

Realistically, incoming data (311 in FIG. 9) will jitter. Jitter might cause two or more counters to be incremented. In the preferred embodiment, the commutative decision circuit (322) detects when two adjacent counters have been incremented. The commutative decision circuit (322) outputs a recovered bit clock signal, the temporal center of which is between the temporal center of the first clock and the temporal center of the second clock.

Those skilled in the art will recognize that using a circuit that is able to simultaneously detect frame synchronization in a serial bit stream while it detects bit synchronization will substantially reduce the time required to lock on to a serial bit stream. By means of a simultaneous detection of clock and frame synchronization the time overhead associated with a distributed frequency wireless local area network that uses discrete time periods to transmit portions of a digital file between users, can transmit more information of the file in a given time period and use less time during the preamble portion if the frame and bit synchronization is performed more expediently.

While the preferred embodiment of the invention was implemented using a field-programmable gate array, alternate implementations would include using a suitably programmed digital signal processor or microprocessor, discrete logic elements, an application specific integrated circuit (ASIC), custom integrated circuits (IC's), or a combination of any of these.

What is claimed is:

1. A circuit for simultaneously acquiring bit synchronization and frame synchronization in a serial data signal having a nominal data rate, said citcuit comprising:
   dual-phase correlator means for indicating frame synchronization, said circuit means having an input receiving said serial data stream at said nominal data rate and having an output, said correlator means further comprising a first M-bit shift register receiving said serial data signal and clocked by a first clock signal at a data rate $\phi1$; a second M-bit shift register receiving said data signal and clocked by a second clock signal at a data rate 518 $1+180°$ degrees; and means for comparing the received data of said first and second shift registers to a predetermined data pattern and for providing an output signal indicating frame synchronization is achieved when said received data of either said first or said second shift register matches said predetermined bit pattern;
   said circuit further comprising an N-stage commutator means for establishing the validity of said nominal data rate of said data stream and for providing a bit clock signal from said data stream when said nominal data rate is valid, said N-stage commutator having an input receiving said serial data stream at said nominal rate.

2. The circuit of claim 1 where said N-stage commutator comprises:

a N-bit shift register having N+1 outputs receiving said data signal and clocked at N time said nominal date rate;

transition detector means, coupled to said outputs of said N30 1 shift registers for detecting data state changes between successive data bits of said data signal, said detector means having N outputs indicating the relative time of occurrence of a data state transition of said data signal;

an N-bit ring counter clocked at N times said nominal date rate for providing N mutually exclusive output signals, each said N mutually exclusive output signal being at said nominal data rate;

N digital counters coupled to said transition detector means and to said N bit ring counter, each of said N digital counters recording the relative time of occurrence of said data state transitions; and control means, coupled to said N digital counters, for identifying the validity of said serial data signal and for providing a bit clock output signal substantially identical to said nominal data rate.

3. The circuit of claim 2 wherein said detector means comprises a plurality of exclusive OR gates coupled to the outputs of said N+1 bit shift register.

4. The circuit of claim 2 wherein said N30 1 bit shift register comprises a six bit shift register.

5. The circuit of claim 1 wherein said dual phase correlator means and said N-stage commutator means is comprised of a digital signal processor.

6. The circuit of claim 1 wherein said dual phase correlator means and said N-stage commutator means is comprised of a microprocessor.

7. The circuit of claim 1 wherein said dual phase correlator means and said N-stage commutator means is comprised of discrete logic elements.

8. The circuit of claim 1 wherein said dual phase correlator means and said N-stage commutator means is comprised of at least one field programmable gate array.

9. The circuit of claim 1 wherein said dual phase correlator means and said N-stage commutator means is comprised of an ASIC.

* * * * *